US006860062B2

(12) United States Patent
Spragins (10) Patent No.: US 6,860,062 B2
(45) Date of Patent: Mar. 1, 2005

(54) INSECT BAITING AND TRAPPING STATION (75) Inventor: Cisse W. Spragins, Minneapolis, MN (US)

(73) Assignee: Rockwell Laboratories, Ltd., Minneapolis, MN (US)

( * ) Notice: Subject to any disclaimer, the term of this patent is extended or adjusted under 35 U.S.C. 154(b) by 38 days.

(21) Appl. No.: 09/981,781

(22) Filed: Oct. 17, 2001

(65) Prior Publication Data
US 2003/0070348 A1 Apr. 17, 2003

(51) Int. Cl.$^7$ .............................................. A01M 23/02
(52) U.S. Cl. ........................................ 43/121; 43/107
(58) Field of Search ........................ 43/121, 131, 107, 43/122, 117, 118, 132.1, 124

(56) References Cited

U.S. PATENT DOCUMENTS

| 666,489 | A | * | 1/1901 | Mercer et al. ................ 70/144 |
| 1,634,648 | A | * | 7/1927 | Cardinet ..................... 43/107 |
| 1,714,666 | A | * | 5/1929 | Gring ......................... 43/121 |
| 3,466,789 | A | * | 9/1969 | Kare .......................... 43/131 |
| 3,704,539 | A | * | 12/1972 | Alvarez ....................... 43/131 |
| 4,452,006 | A | * | 6/1984 | Steck et al. .................. 43/122 |
| 4,483,095 | A | * | 11/1984 | Webinger ...................... 43/131 |
| 4,858,374 | A | * | 8/1989 | Clemons ....................... 43/122 |
| 5,189,831 | A | * | 3/1993 | Miller et al. ................. 43/121 |
| 5,357,709 | A | * | 10/1994 | Lin ............................ 43/131 |
| 5,392,558 | A | * | 2/1995 | Blomquist ..................... 43/107 |
| 5,452,540 | A | * | 9/1995 | Dowd et al. ................... 43/107 |
| 5,520,305 | A | * | 5/1996 | Pierson ....................... 215/206 |
| 5,992,087 | A | * | 11/1999 | Chu et al. .................... 43/122 |
| 6,138,402 | A | * | 10/2000 | Wotton ........................ 43/122 |
| 6,189,259 | B1 | * | 2/2001 | Soller ......................... 43/131 |
| 6,202,341 | B1 | | 3/2001 | Bernard |
| 6,216,384 | B1 | * | 4/2001 | Dickson et al. ............... 43/131 |
| 6,219,960 | B1 | | 4/2001 | Contadini et al. |
| 6,219,961 | B1 | * | 4/2001 | Ballard et al. ................ 43/131 |
| D456,058 | S | * | 4/2002 | Rollins ....................... D22/122 |
| D456,481 | S | * | 4/2002 | Stevenson et al. ............. D22/122 |
| 6,370,811 | B1 | * | 4/2002 | Masterson ................... 340/573.1 |

(List continued on next page.)

FOREIGN PATENT DOCUMENTS

DE 3429002 A1 * 2/1986 .......... A01M/23/02

OTHER PUBLICATIONS

Hedges, S., Still in Development, Exterior Monitoring Systems are the Future of IPM, PCT Pest Control Technology, Apr. 1998.

Primary Examiner—Peter M. Poon
Assistant Examiner—Bethany L. Griles (57) ABSTRACT An insect station for insects having a base, a retainer, a cover and a disposable cup. The base and retainer engage the cup about the opening of the cup. The cover engages the base over the opening of the cup to minimize the collection of rain and dirt in the cup. A hole is dug in the ground for the insect station. The base is disposed at about grass level and is anchored with stakes into the turf. Openings between the cover and the base permit insects access to the cup. The cover and base include key and keyhole structures such that a certain level of effort is required to remove the cover from the base. The insect station may be used trapping/monitoring, where the retainer is used in the nature of a funnel to maximize the chances that insects will fall into the cup, where water, beer or another attractant can be placed. The insect station may also be used for baiting, where the retainer is flipped the other way and is used in the nature of a seal to minimize entry of dirt and water into the cup, where liquid, granular or gel bait is placed. Instead of being set in the ground, the insect station may be hung from a tree, post or other object or be placed on a surface "upside down" such that the cup points upwardly.

18 Claims, 10 Drawing Sheets

U.S. PATENT DOCUMENTS

| | | | |
|---|---|---|---|
| 6,374,536 B1 * | 4/2002 | Washburn | 43/131 |
| 6,378,243 B1 * | 4/2002 | Snell et al. | 43/131 |
| 6,393,760 B1 * | 5/2002 | Lingren | 43/107 |
| 6,430,868 B1 * | 8/2002 | Plato et al. | 43/121 |
| 6,474,015 B1 * | 11/2002 | Lund et al. | 43/124 |
| 6,516,559 B1 * | 2/2003 | Simchoni et al. | 43/114 |
| 6,543,182 B2 * | 4/2003 | Snell et al. | 43/132.1 |
| 6,546,668 B1 * | 4/2003 | Ball et al. | 43/131 |
| 6,550,181 B1 * | 4/2003 | Ray | 43/107 |
| 6,609,329 B2 * | 8/2003 | McCallum | 43/107 |
| 6,631,583 B2 * | 10/2003 | Rollins | 43/124 |
| 6,637,149 B1 * | 10/2003 | Bauer | 43/107 |
| 6,665,979 B1 * | 12/2003 | Hsu | 43/112 |
| 6,688,035 B1 * | 2/2004 | Shichman | 43/112 |

* cited by examiner

INSECT BAITING AND TRAPPING STATION

BACKGROUND OF THE INVENTION

The present invention relates to a station for insects, particularly to an insect station that may be used for baiting, trapping, and/or monitoring insects, and specifically to such an insect station that incorporates a disposable cup.

The pitfall trap is a favorite trap in Hollywood. For example, in the classic Walt Disney® movie "Swiss Family Robinson" a pitfall trap captures a lion, houses the lion, and then captures pirates with the lion still in the bottom of the trap. In a television series, brothers pry the cover off a sewer pipe, stretch sheeting over the opening, and then promptly forget about the trap, into which one brother instead of the babysitter later blunders.

Exactly like the human pitfall trap, the insect pitfall trap captures insects that blunder into the trap. The conventional insect pitfall trap is used outside about a house or building. The insect pitfall trap is set in the dirt or turf. The pitfall trap may be a large, plastic cup or a one or five gallon plastic bucket. Holes may be punched in the bottom of the trap to permit drainage. Covers may be placed over the trap. An inner cup may be placed inside the outer cup, with the inner cup only be taken out of the ground to be emptied of trapped pests, water and debris.

SUMMARY OF THE INVENTION

A feature of the present invention is a combination of parts that engage a disposable plastic or paper cup and makes an effective insect station out of a disposable plastic or paper cup.

Another feature of the present invention is a base that surrounds an upper edge of the cup and engages the cup in and by itself with or without aid from any of the other parts.

Another feature of the present invention is a cover that hand locks to the base to prevent the cup from being removed from the base and to protect an interior of the cup from being accessed by children, cats, dogs, squirrels and other animals.

Another feature of the present invention is a retainer that is disposed between the cover and the base and that, in one funnel-like orientation, aids the fall of insects into the trap and, in cap-like orientation, aids in sealing the cup against the entry of dirt and moisture.

Another feature of the present invention is the unique combination of a base, a disposable cup, and a retainer that confronts the cup and engages the base to make an even more effective insect station out of the disposable cup.

Another feature of the present invention is the unique combination of a base, a disposable cup, and a cover that locks to the base such that a certain level of effort is required to remove the cover and access the interior of the disposable cup.

Another feature of the present invention is the unique combination of a base, a disposable cup, a retainer, and a cover.

Another feature of the present invention is the provision of a unique keyhole and key structure between the cover and the base. Here the key must be flexed prior to being introduced into the keyhole. After the key is introduced into the keyhole, the key must again be flexed to move the key into a locked position. When in the locked position, the key prevents movement of the cover and base in the axial direction, but permits relative rotational movement between the cover and base.

Another feature of the present invention is the provision of a tapering structure to at least one of the base and cup. A tapering structure on at least one of the base and cup permits the cup to be wedged securely into the base. Most preferably, both of the base and cup taper in the same direction and at the same rate such that the cup can be even more securely wedged into the base.

Another feature of the present invention is a feeding matrix. The feeding matrix is a network of lines that permits ants to crawl in and out of the insect station.

Another feature of the present invention is the provision of fins radiating from the base to minimize rotation of the base when the base is set in the ground.

Another feature of the present invention is the provision of first and second pieces wherein the first and second pieces can be engaged to each other to form a harborage therebetween for insects, and the further provision of a key and keyhole locking mechanism on the first and second pieces.

Another feature of the present invention is the provision of water control. Water may run over a rim of the base that is set at ground level and onto a retainer, then down the retainer and out of the base through an opening in the base. The retainer minimizes the chances of water running into the cup by the provision of an upper portion of the retainer being disposed at a level above the rim of the base, by the provision of a lower edge of the retainer being disposed beyond the lip of the cup, and by the provision of a water opening formed in the base at the level of the lower edge of the retainer.

Another feature of the present invention is the provision of a tortuous route out of the cup for insects that blunder into the cup. First, the sidewall of the cup is slippery. Many kinds of insects physically cannot walk up the sidewall. Second, the retainer when placed in the station in the form of a funnel projects into the cup such that an underside of the funnel extends downwardly and inwardly from an inner upper portion of the sidewall of the cup. Accordingly, if an insect happened to walk to the top of the sidewall, the insect would then be forced to walk downwardly and inwardly on the underside of the funnel to the outlet of the funnel. Third, the retainer includes an apertured retainer disk that may be placed at the outlet of the funnel. The apertures permit insects access into the cup of the station, yet restricts the size of the funnel or retainer outlet to minimize the chances of escape.

Another feature of the present invention relates to methods of use. In one method of use, the retainer is disposed in the nature of a cap over the cup opening and seals the cup opening in combination with the cover to minimize moisture and dirt from being blown or otherwise introduced into the cup. In this method, the insect station is used as a baiting station where ants or other insects take the bait back to their nests. In another method, the retainer is flip-flopped to take the form of a funnel to aid in the fall of insects into the cup. In this method, the insect station is used as a trapping and monitoring station where insects are trapped forever in the cup and where the types of insects in the area may be identified.

An advantage of the present invention is safety. The insect station is safe because a lock is provided to minimize the chances that children will handle bait in the station. The lock is relatively tortuous to open by requiring a rotation between the cover and the base followed by a flexing of feet (or keys) and a simultaneous drawing of the cover and base away from each other. The insect station is safe because it includes a cover. The insect station is safe because it maintains a low profile, thereby minimizing the chances that pets, children and adults will trip over the station, and thereby maximizing the chances that a lawnmower will cut over the station. The insect station is safe because it may be held down against the ground with securing spikes.

Another advantage of the present invention is cost. The insect station is inexpensive because it utilizes a disposable cup. The insect station is inexpensive because the cup need not be separately molded nor does tooling have to be located and purchased. The insect station is inexpensive because the parts that make up the station are molded.

Another advantage of the present invention is range of use. The insect station may be used as a station for trapping and/or monitoring where the intent is to provide no escape from the cup such that the type of insects in the area may be identified. The insect station may also be used as a station for baiting, where bait is placed in the cup and an avenue of escape is provided for the insect such that the insect may take the bait back the nest. The insect station may further be set in the ground or hung from a relatively high position for flying insects. The insect station may further be placed on a surface "upside down" such that the base rests on the surface and the cup points upwardly, an orientation that is particularly effective for catching flying insects that time and time again fly for the light shining through the plastic cup.

Another advantage is that the insect station is simple to manufacture and simple to assemble, disassemble and reassemble.

Another advantage is that the insect station may be used with or without bait or attractants because insects blunder into the trap seeking harborage. Whether the insect station is used as a pitfall trap or baiting station, the cover itself is an attractant because insects naturally seek harborage.

Another advantage is that the insect station is strong and durable. The station may be stepped upon by pets, children and even adults with little chance of breakage because the disposable cup is set in the ground and isolated from the force of a step by the cover, retainer and base.

Another advantage of the insect station is that it is unobtrusive. The insect station blends into the landscape because it is unobtrusive.

DESCRIPTION

Figure 1:
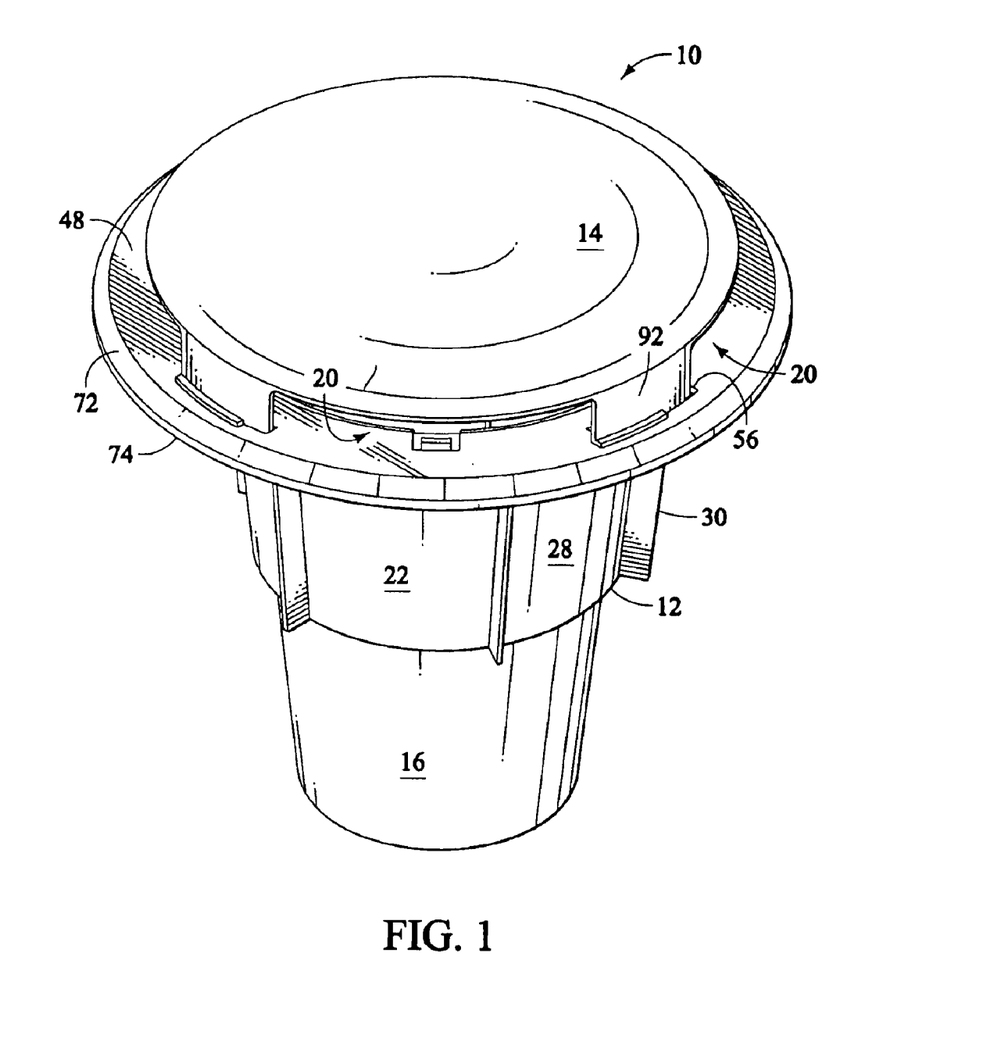
FIG. 1 is a perspective view of the insect station.

FIG. 1 shows the insect station or insect pitfall trap 10. Generally, the insect station 10 includes a base 12, a cover 14, a receptacle or cup 16 and a retainer 18 (shown in FIGS. 2 and 3). A hole is dug for the station 10. The cup 16 is inserted into the base 12. The retainer 18 is then engaged in the base 12 on top of the cup 16. The base 12, cup 16, and retainer 18 are placed in the hole. Bait or attractant may be placed in the cup 16. The cover 14 is then locked to the base 12. Insects crawl or fly through openings 20 formed between the base 12 and the cover 14.

Figure 6:
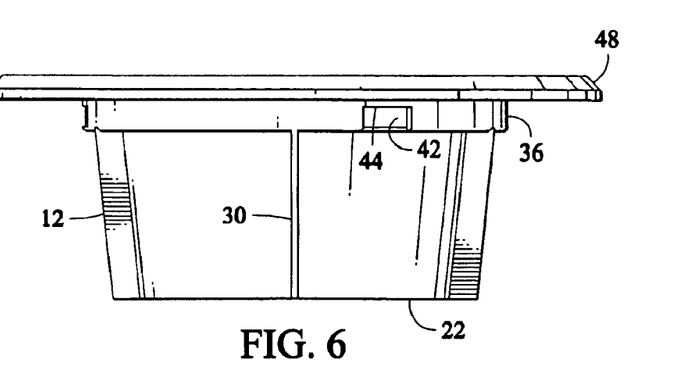
FIG. 6 is a side detail view of the base of the insect station.
Figure 7:
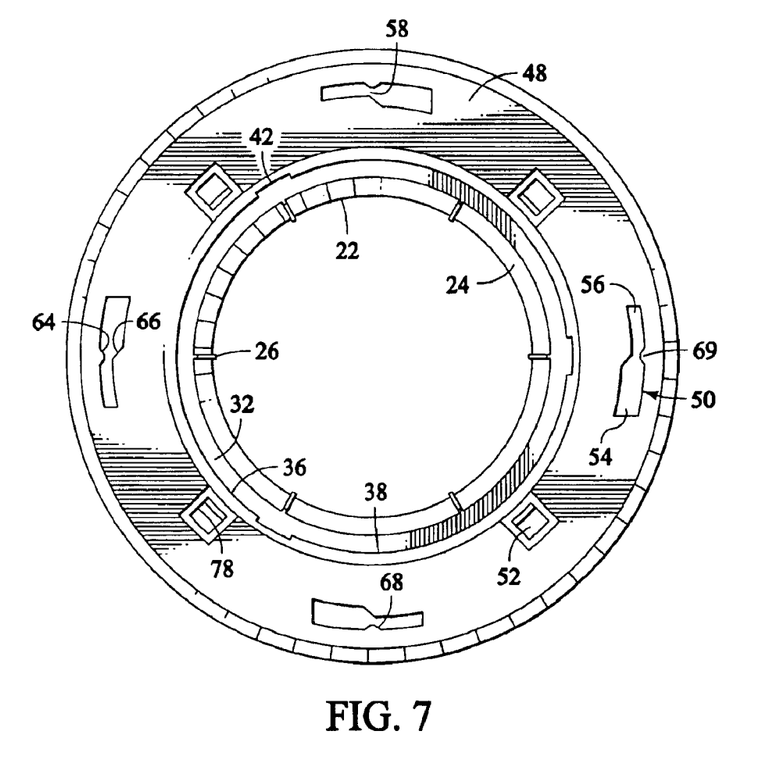
FIG. 7 is a top detail view of the base of the insect station.
Figure 11:
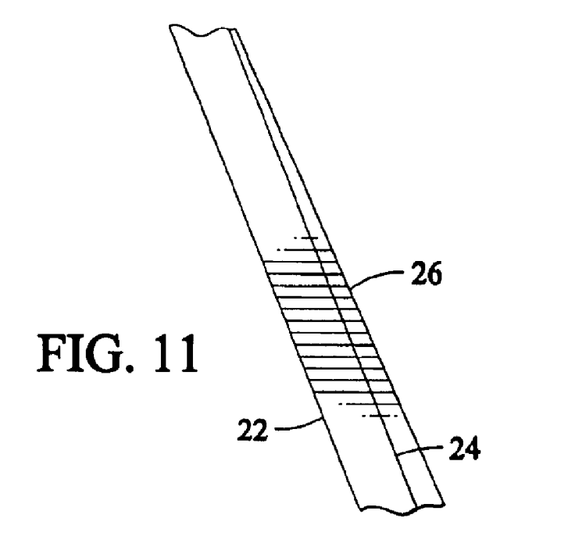
FIG. 11 is a partial section view of a sidewall of the base of the insect station.

As shown in FIGS. 1, 6 and 7, base 12 includes a first sidewall 22 for engaging the cup 16. First sidewall 22 is endless and annular and frustoconical and forms an opening or base opening. First sidewall 22 tapers downwardly. First sidewall 22 includes an inner surface 24. Six ribs 26 run from a top edge of the first sidewall 22 to a lower edge of the first sidewall 22 and extend slightly from the inner surface 24. At the top edge of the first sidewall 22, ribs 26 extend only slightly from the inner surface 24. As the ribs 26 run toward the lower edge, the ribs 26 extend further from the inner surface 24 such that an inner edge of the ribs 26 tapers at a greater rate than does the inner surface 24, as shown in FIG. 11. Ribs 26 thereby dig progressively deeper into the cup 16 as the cup 16 is wedged into the first sidewall 22. First sidewall 22 includes an outer surface 28. Six fins 30 radiate outwardly from surface 28 and extend from an upper edge of the first sidewall 22 to a lower edge of the first sidewall 22. Fins 30 minimize rotation of the insect station 10 when it is set in the turf. Fins 30 further provide rigidity to the base 12 as a whole. An outer edge of fin 30 tapers at the rate of first sidewall 22. Sidewall 22 and base 12 as a whole is offset from the bottom of the cup 16 such that the sidewall 22 and base 12 as a whole are at a first level and the bottom of the cup 16 is at a second level. Sidewall 22 of the base 12 and the sidewall of the cup 16 taper in the same direction.

Figure 4:
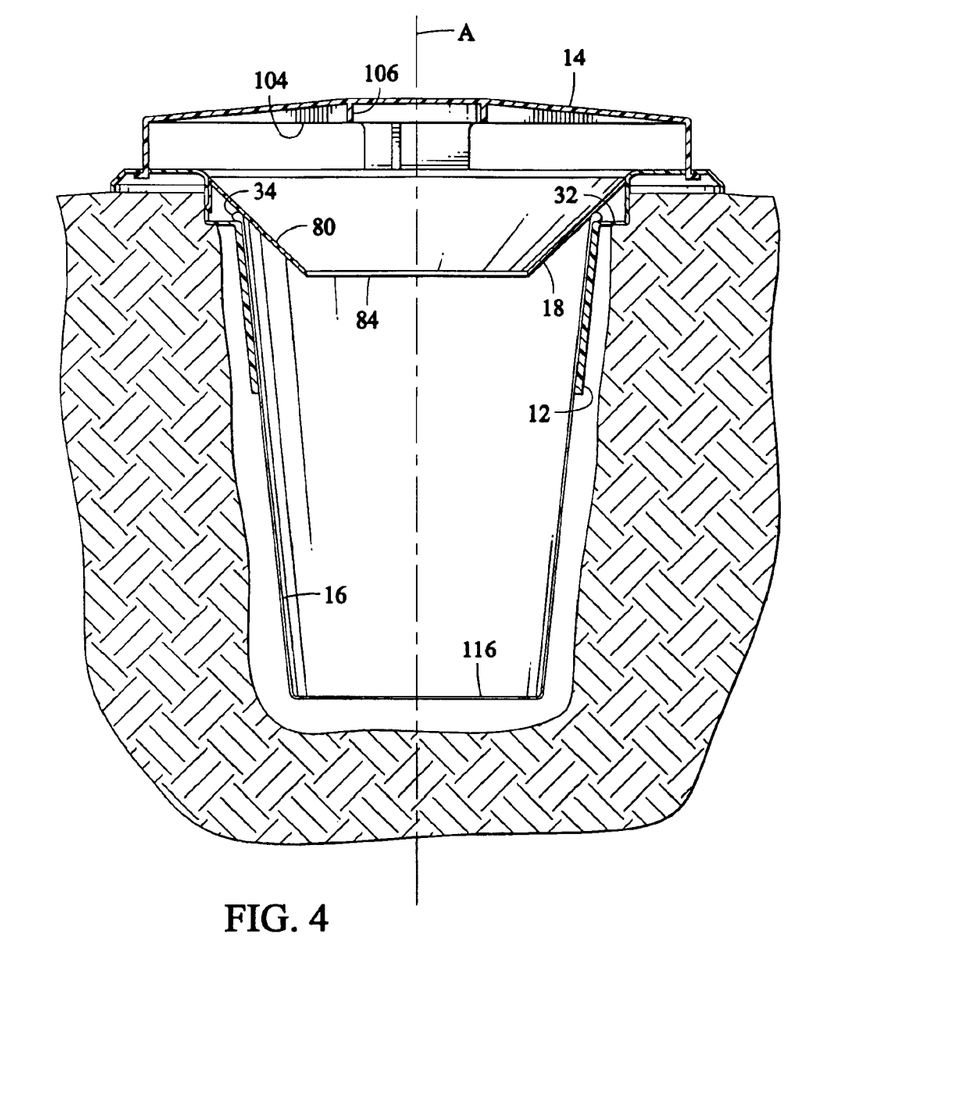
FIG. 4 is a detail section view of the insect station of FIG. 2.
Figure 5:
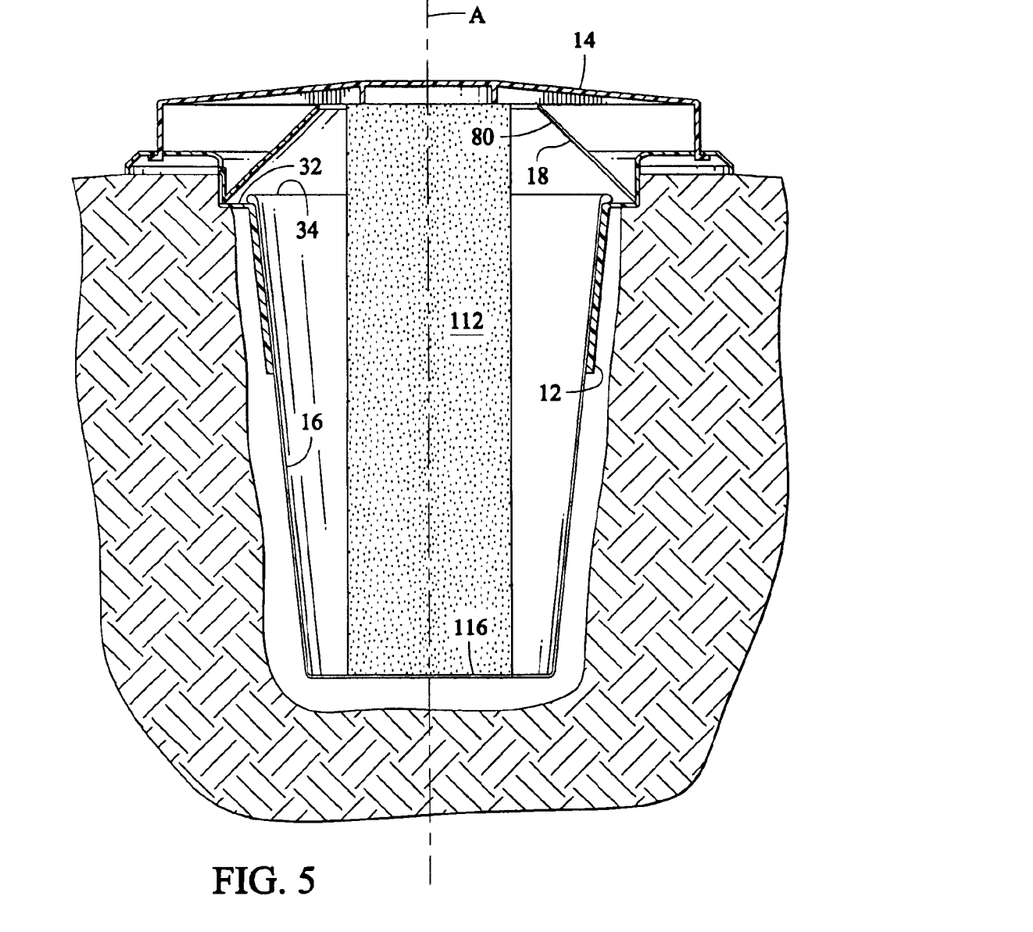
FIG. 5 is a detail section view of the insect station of FIG. 3.

Base 12 further includes a first flange or lip or cup lip seat or inner rim 32 and this lip 32 is effectively the top edge of the first sidewall 22. Lip 32 receives and supports a lip 34 of the cup 16, as shown in FIGS. 4 and 5. Lip 32 is integral with the first sidewall 22 and extends annularly and outwardly from first sidewall 22. The width of the lip 32 is equal to the width of each of the fins 30, and the fins 30 provide rigidity to the lip 32.

Base 12 further includes a second sidewall 36. Second sidewall 36 is annular and endless and extends upwardly from an outer edge of lip 32. Second sidewall 36 tapers slightly from an upper edge to a lower edge, albeit not at a rate as great as first sidewall 22. Second sidewall 36 includes an inner surface 38 that engages the retainer 18 and hugs the retainer 18 and the tabs 40 of the retainer 18 as the retainer 18 slides in the direction of first lip 32. Second sidewall 36 further includes openings 42 formed in part by an upper edge 44. Upper edges 44 engage claws 46 of the tabs 40 when the retainer 18 is placed in the base 12 in the nature of a funnel as shown in FIG. 2.

Base 12 further includes a second lip or outer rim 48. Second lip 48 is annular and endless and extends outwardly from second sidewall 36. Second lip 48 includes a set of first openings or keyholes or receptors 50 and a second set of openings 52 for receiving anchors or stakes for anchoring the insect station 10 to the turf. Each of the keyholes 50 includes a relatively wide opening 54 that communicates with a relatively narrow opening 56. A neck 58 runs between the openings 54 and 56. Neck 58 is formed by oblique edges 64 and 66, which form a portion of opening 54. Neck 58 is further formed by oblique edge 68, which forms a portion of opening 56. Oblique edges 64 and 68 form in part a tab or bump 69.

Second lip 48 further includes an annular endless sharp edge 70 for digging into turf and stabilizing the insect station 10. Edge 70 is formed by an oblique upper annular surface 72 running into a vertical annular surface 74, which meets an oblique lower annular surface 76, thereby forming sharp edge 70. Besides being integral with second sidewall 36, second lip 48 is further supported via the second sidewall 36 by the provision of a boss 78 formed about each of the stake openings 52. Each boss 78 extends from the second sidewall 36 to the second lip 48. Each boss 78 lies in a plane disposed at an angle to the axis of the station 10 such that the spikes or stakes may extend at an angle outwardly from the station 10.

Figure 2:
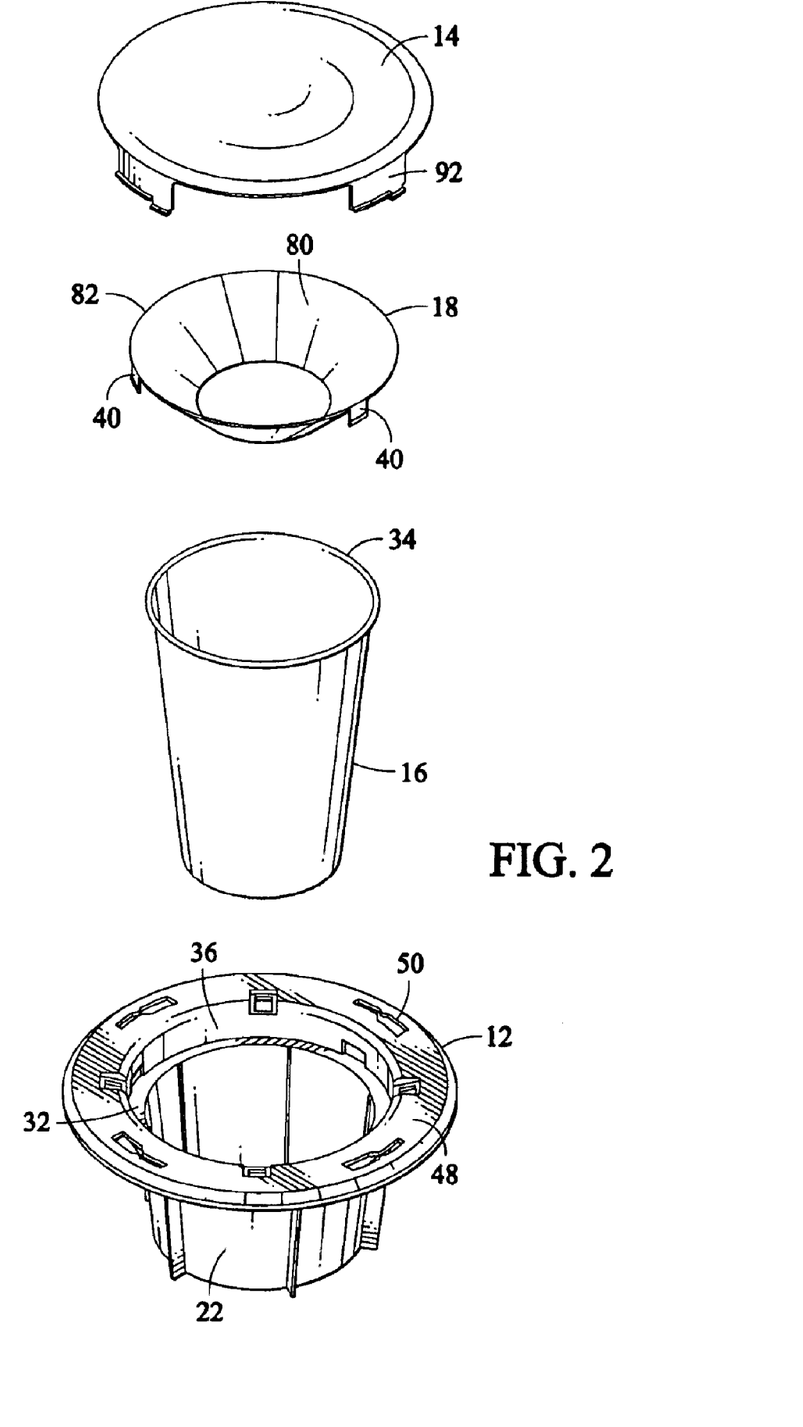
FIG. 2 is a perspective exploded view of the insect station, with the retainer being disposed in the nature of a funnel such that the insect station may be used as a trapping/monitoring station.
Figure 3:
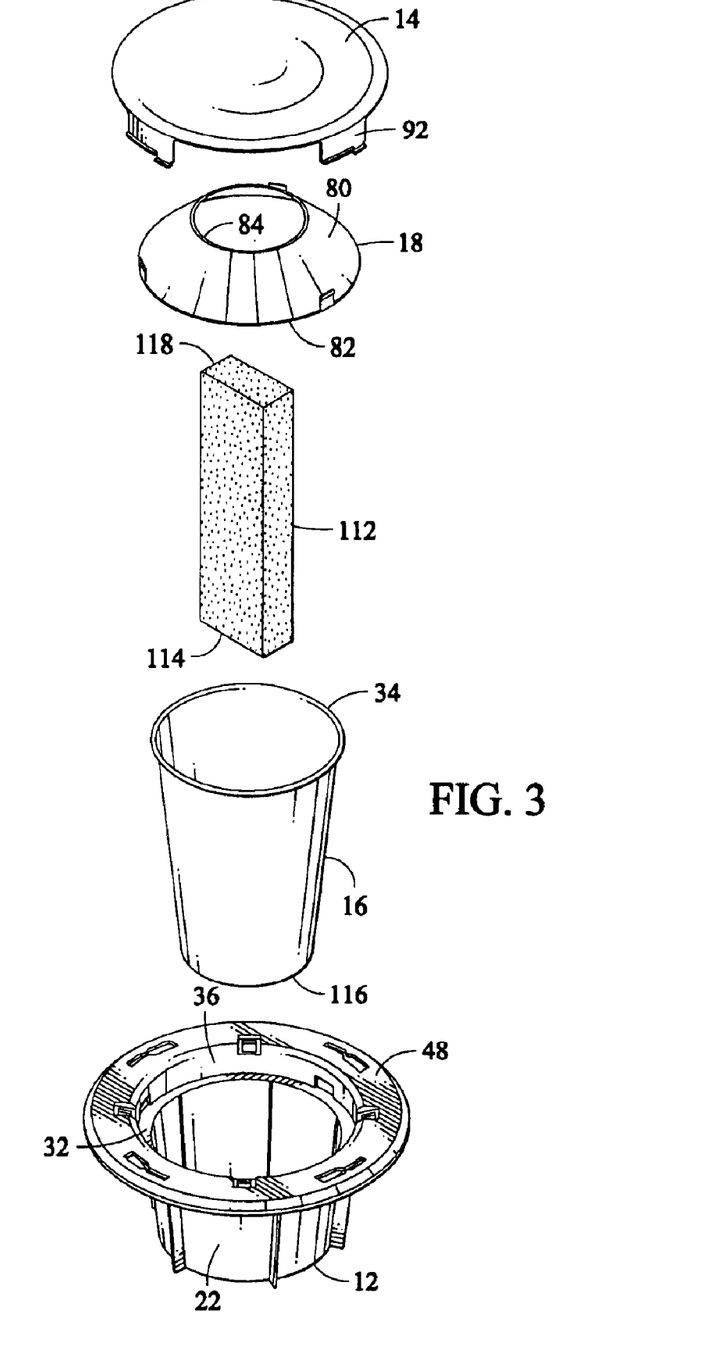
FIG. 3 is a perspective exploded view of the insect station, with the retainer being disposed in the nature of a cap such that the insect station may be used as a baiting station.
Figure 9:
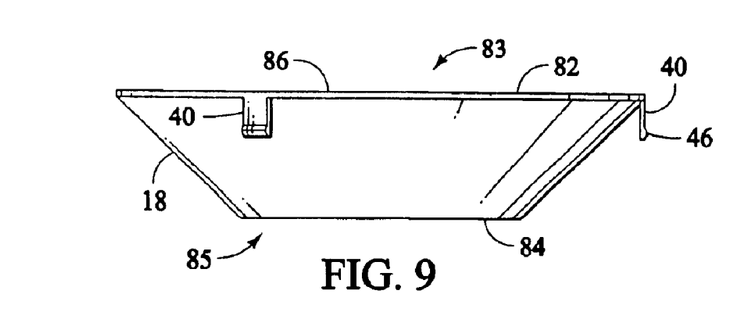
FIG. 9 is a side detail view of the retainer.

Retainer or retainer ring 18 is frustoconical (retainer 18 forms a portion of a cone) and annular, as shown in FIGS. 2, 3 and 9. Retainer 18 includes a set of three tabs 40, with each of the tabs 40 having a claw or catch 46. Retainer 18 includes an endless tapering sidewall 80 that tapers from edge 82 to edge 84. Edge 82 forms an opening 83. Edge 84 forms an opening 85. Circular edge 82 has a flat endless annular face 86 that has a diameter and a circumference slightly greater than the diameter and circumference of the inner surface 38 of the second sidewall 36 where the inner surface 38 meets the first lip 32. Accordingly, with or without tabs 40, retainer 18 slightly frictionally engages base 12 as the retainer 18 is set in the base 12 in the nature of a cap, as shown in FIGS. 3 and 5.

Each of the tabs 40 has a catch or barb 46 that extends slightly beyond the circumference defined by annular face 86. Barb 46 engages sidewall inner surface 38 prior to when edge 82 makes contact with the first lip 32 (when the retainer 18 is being set in the base 12 in the nature of a cap as shown in FIGS. 3 and 5) and, as the barbs 46 makes contact with the inner surface 38, the tabs 40 flex and resiliently bend toward the axis of the retainer 18. Such a frictional engagement further engages retainer 18 to the base 12 when the retainer 18 is set in the base 12 in the nature of a cap, as shown in FIGS. 3 and 5. When the cover 14 is engaged to the base 12, the underside of the cover 14 is spaced from edge 84. Such a spacing just permits insects to crawl through opening 85 into the interior of the cup 16. Such a spacing minimizes evaporation of bait from the cup 16.

When retainer 18 is engaged in the base 12 in the nature of a cap or hill as shown in FIGS. 3 and 5, sidewall 80 of the retainer 18 is slightly spaced from the upper edge 34 of the cup 16. If the cup 16 becomes dislodged from the base 12, the sidewall 80 of the retainer 18 keeps the cup 16 in the insect station 10. If the retainer 18 becomes dislodged from the second sidewall 36, the retainer 18 and the cup 16 are kept in the base 12 via the cover 14.

When the retainer 18 is disposed in the base 12 in the nature of a funnel, as shown in FIGS. 2 and 4, barbs 46, that are formed on the end of the resilient tabs 40, preferably snap into openings 42 to engage edge 44 such that the retainer 18 is engaged to the base 12. Even if the retainer 18 is set into the base 12 such that the tabs 40 do not align with openings 42, the retainer 18 engages the base 12 anyway because the barbs 46 begin to make contact with tapered inner surface 38 as retainer 18 is set in the base 12. Then, as the retainer 18 is further set into the base 12, the tapered inner surface 38 pushes the barbs 46 and tabs 40 toward the axis of the retainer 18 such that the retainer 18 and base 12 frictionally engage each other. The retainer 18 in this orientation may be pushed into the base 12 until the sidewall 80 of the retainer 18 makes contact with the upper edge 34 of cup 16. At this point edge 84 of the retainer 18 is disposed within the cup 16 and edge 82 is disposed at about the level of the second lip 48. Again, if the cup 16 becomes dislodged from the tapered sidewall 22, the retainer 18 keeps the cup 16 in the base 12. If the retainer 18 becomes dislodged from the second sidewall 36, the cover 14 keeps the retainer 18 in the base 12.

In short, it can be appreciated that the retainer 18 can be flipped-flopped. In other words, the retainer 18 can be disposed right-side up or upside down. In still other words, the retainer 18 can be orientated in the nature of a funnel or in the nature of a cap (or hill).

Figure 8:
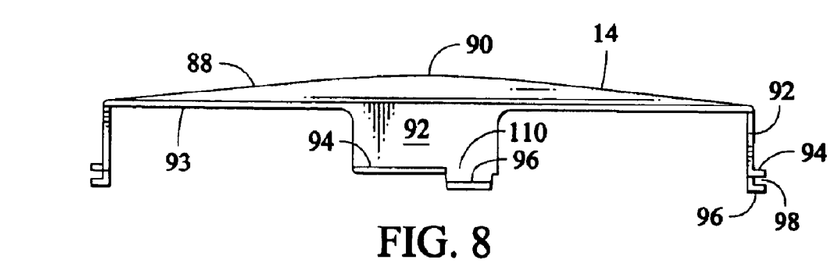
FIG. 8 is a side detail view of the cover.
Figure 13:
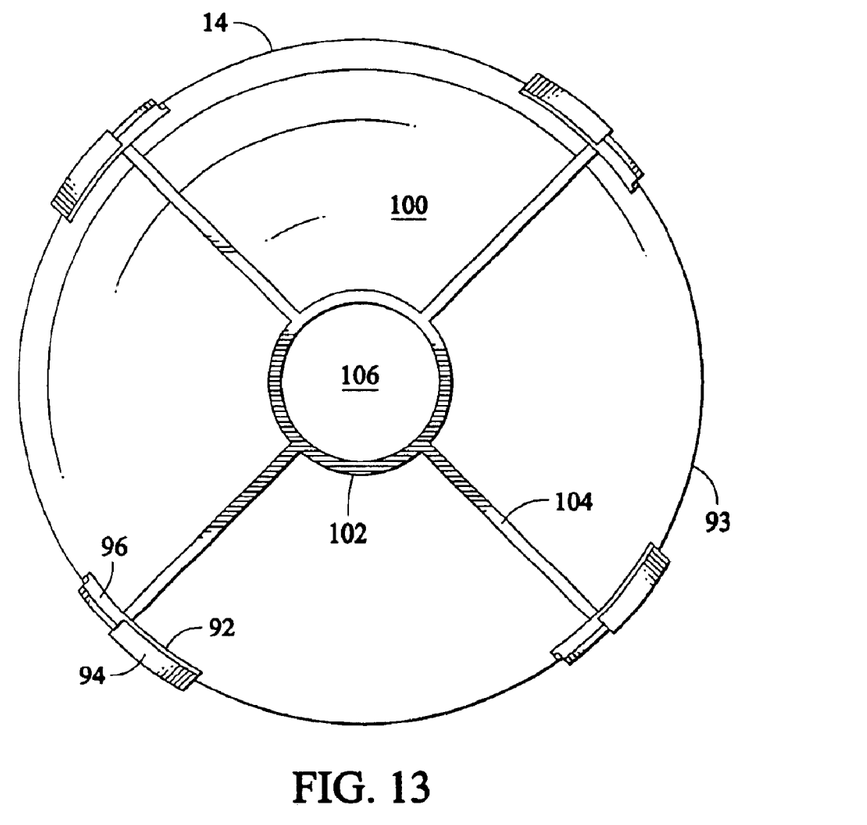
FIG. 13 is a bottom view of the cover of the base of the insect station.

As shown in FIGS. 1, 8 and 13, cover 14 includes a roof 88 that slopes from an apex 90. Cover 14 includes a width that is greater than the base opening defined by the second sidewall 36 or the base opening defined by sidewall 22. Cover 14 further includes a set of four keys or legs or extensions 92 formed on a peripheral edge 93 of the cover 14. Each of the legs 92 includes a pair of feet 94 and 96. Foot 94 is disposed closer to edge 93 than foot 96 such that, when an edge of the cover 14 is viewed tangentially as shown in FIG. 8, a slot 98 is formed between the feet 94 and 96. Feet 94 and 96 extend outwardly from leg 92 and outwardly relative to peripheral edge 93. Leg 92 is on the same curve as the peripheral edge 93 and the outer edges of feet 94 and 96 also maintain the same curve. Cover 14 is integral with legs 92 and feet 94 and 96 and is preferably molded plastic. Legs 92 resiliently bend inwardly toward an axis on which the apex 90 lies when the legs 92 are pushed in such a direction by hand. As shown in FIG. 13, an underside 100 of the cover 14 includes a circular endless rib 102 and further includes linear ribs 104 radiating from the circular endless rib 102 to each of the legs 92. The ribs 102 and 104 provide rigidity to the cover 14 as a whole and further provide rigidity to each of the legs 92, though the legs 92 may still be flexed inwardly when pushed by hand. Rib 102 defines a central feeding location 106 for the placement of bait or attractant. It should be noted that, when disposed "upside down," cover 14 is a receptacle since it has a relatively low point (the underside of the apex 90) and a relatively high surrounding portion (the edge 93), thereby keeping liquid bait or attractant within the underside 100 of the cover 14.

Cover 14 is engaged to the base 12 by setting two adjacent longer feet 96 in two respective adjacent wide openings 54. At this point, the other two longer feet 96 come to rest on the cover 14 just beyond the other two wide openings 54 because the outside distance between two diametrically opposed feet 96 is slightly greater than the distance between the outer edges of two diametrically opposed openings 54. To place the other two longer feet 96 into their respective openings 54, the other two longer feet 96 are pressed inwardly toward the axis of the cover 14. After all four feet 96 extend through their respective openings 54, feet 94 come into contact with the upperside of the second lip 48 and prevent the feet 96 and the cover 14 as a whole from being drawn closer to the base 12. At this point, the second lip 48 is riding in the slot 98. At this point, cover 14 and base 12 are prevented from being drawn to and away from each other along an axis of the cup 16, base 12 and cover 14. At this point, however, cover 14 and base 12 may be rotated relative to each other such that a portion 110 of leg 92 slides over bump 69 of base 12 and snaps into opening 56, whereby the cover 14 is locked to the base 12 because feet 96 are of a greater size than openings 56 (thereby preventing axial removal of the cover 14 from the base 12) and because legs 92 having feet 96 are retained by bump 69 (thereby preventing relative rotation of the cover 14 and base 12 without a flexing of legs 92). To unlock the cover 14 from the base 12, the cover 14 and base 12 are rotated relative to each other such that portion 110 of leg 92 rotates out of opening 56 and snaps into opening 54. Then two adjacent legs 92 are pushed inwardly such that feet 96 may be drawn out of openings 54. Then the cover 14 and base 12 are axially drawn away from each other.

It should be noted that, when all four legs 92 are in opening 54, the legs 92 are at rest and are not flexed. In this orientation, there is some play between the cover 14 and base 12. However, the cover 14 is locked to the base 12 because two of the legs or keys 92 must be flexed to disengage the cover 14 and base 12 from each other.

It should be noted that, when all four legs 92 are in opening 56, the legs 92 are at rest and are not flexed. In this orientation too, there is some play between the cover 14 and the base 12. However, the cover 14 is locked to the base 12 because the following two steps must occur to disengage the cover 14 from the base 12. The first step is that the cover 14 and base 12 must be rotated relative to each other to induce an inward flexing of the legs 92 as the legs 92 pass over the bumps 59 and to induce an outward snapping back as the legs 92 fully reach openings 54. This first step of rotation must occur because the narrow opening 56 is of a lesser area than foot 96. Foot 96 is sufficiently small to pass through opening 54 but is sufficiently large so as not to pass through opening 56. Accordingly, an inward flexing of leg 92 when foot 96 is in narrow opening 56 does not produce progress toward an unlocking of the cover 14 from the base 12. The second step occurs after foot 96 has been slid to opening 54. This second step is that two adjacent legs 92 are pushed inwardly, whereupon foot 96 becomes disengaged from the outer edge forming opening 54 and whereupon the other two adjacent legs 92 may be drawn out of their respective openings 54 without a flexing of such other two adjacent legs 92.

As shown in FIG. 3, a network or matrix 112 may be disposed in the insect station 10. The network 112 is a mesh or box shaped collection of line. The network 112 includes a first end 114 that rests on a floor 116 of the cup 16 and a second end 118 that is preferably disposed adjacent edge 84 of retainer 18 when retainer 18 is disposed in the nature of a cap as shown in FIG. 3. Ants may crawl through one of the openings 20, up sidewall 80 of retainer 18, through opening 85 of retainer 18, onto end 118, down through the network 112 and to the bottom 116 of the cup 16 to pick up bait. The ants then take the bait, crawl back up the network 112, out of opening 85, down sidewall 80, out of one of the openings 20 and back to their nest or nests where the ant community may be poisoned by the bait. It should be noted that the network or matrix 112 minimizes the chances that insects will drown in liquid bait because some insects give off warning signs to other insects upon injury or death. For example, ants may crawl down the network to the surface of the liquid, take the liquid bait, then crawl back up the network 112. Another means for minimizing injury or death to the insects is the provision of a wicking material or sponge that extends from the bottom of the cup 16 to the base 12 or to the retainer 18 or to the cover 14 such that insects can access the liquid bait at an upper portion of the insect station 10.

The cup or receptacle 16 includes the endless tapered sidewall that tapers from the upper integral edge 34 to the integral floor 116. The cup 16 is preferably selected from the group consisting of paper and plastic cups. Plastic cups are more preferably selected. The cup 16 may be formed of a clear, opaque or translucent plastic. Plastic cups 16 that permit the transmission of some light are preferred when the station 10 is hung from an object or is placed "upside down" on a surface because many insects are attracted to light. The sidewall of the cup 16 is somewhat resilient so as to permit the cup 16 to give as it is wedged into the base 12. The sidewall of the cup 16 is somewhat rigid so as to resist the wedging action and so as not to fold as the cup 16 is wedged more tightly into the base 12. The cup 16 is preferably an inexpensive and disposable cup such that the cup, its bait, dirt, grass, water, and other debris in the cup may simply be thrown away instead of cleaned. The lip 34 (the upper edge of the cup 16) forms an opening or cup opening.

It should be noted that the base 12, cover 14, and retainer 18 are molded from plastic, are molded from the same type of plastic and have the same hardness. Each of the base 12, cover 14 and retainer 18 is an integral part. Cup 16 is also preferably molded from plastic.

FIG. 1 shows an assembled insect station 10. FIG. 1 further shows leg 92 (a flexible key) locked in narrow opening 56 (a portion of a keyhole).

FIGS. 2 and 4 show how the insect station 10 is used for trapping and/or monitoring insects. In such a method, the retainer 18 is oriented in the nature of a funnel, with the greater diametrical edge 82 closer to the cover 14 than the other edge 84. In such a method, an insect may crawl through opening 20, blunder down sidewall 80, and fall into the cup 16. The cup 16 may house simply water, beer or some other attractant or nothing at all.

FIGS. 3 and 5 show how the insect station 10 is used for baiting. In such a method, the retainer 18 is oriented in the nature of a cap, with the greater diametrical edge 82 adjacent to the upper edge 34 of the cup 16. In such a method, an insect may crawl through opening 20, crawl up the sidewall 80 of the retainer 18, into and down the network 112, to the bottom 116 of the cup 16, up the network 112, down the sidewall 80 and back to its nest.

FIGS. 6, 7, 8 and 9 show details of the base 12, cover 14 and its key 92 and feet 94 and 96, and the retainer 18.

Figure 10:
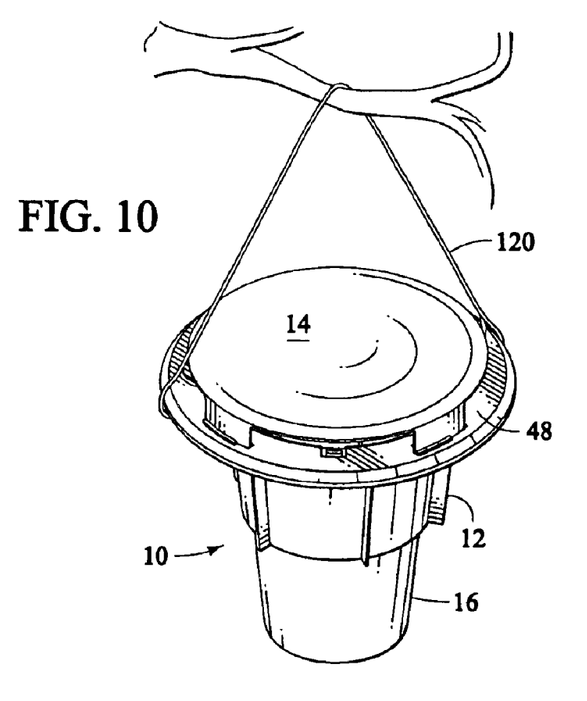
FIG. 10 shows a perspective view of the insect station hanging from a branch of a tree.

FIG. 10 shows that the insect control station 10 is not limited to use in the ground. FIG. 10 shows the insect control station 10 hanging from a branch of a tree via a line 120 that may be engaged in the openings 52 otherwise utilized by stakes or anchors. In this method, flies and other flying insects may be drawn or attracted into the cup 16. A clear or translucent cup 16 may be used to transmit light and draw insects away from the exit. The insects keep trying to fly toward the light instead of returning the way they came in, a route to which they are less attracted because the retainer 18 and cover 14 do not transmit light and are relatively dark. In this method, the retainer 18 may be disposed in any one of its two orientations. Still further, no branch or high position is required. The station 10 may be set in the "upside down" position on a surface where the roof 88 makes contact with the surface and acts as a base. Though the roof 88 includes a slope and though the station 10 in such a orientation wobbles somewhat, the station 10 stands "upright." In the "upside down" position, bait or attractant may be placed in feeding location 106 that is disposed within edge 84 or edge 82 of the retainer 18. Preferably, when the station 10 is disposed in the "upside down" orientation, the retainer 18 points toward the cover 14 such that the smaller opening 85 (formed by edge 84) is adjacent to the cover 14.

FIG. 11 shows further details of the base 11.

Figure 12:
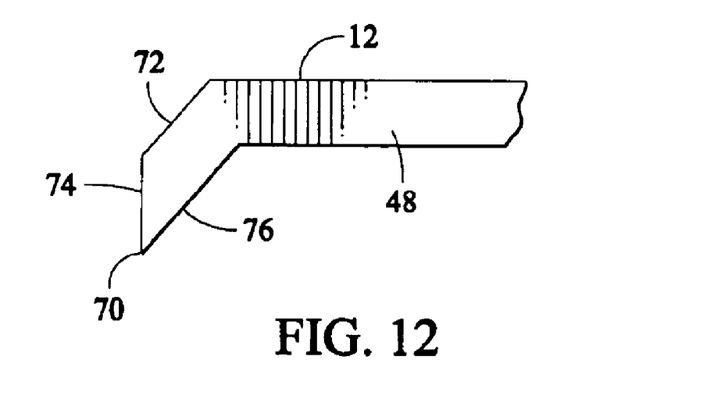
FIG. 12 is a partial section view of a lip of the base of the insect station.

FIGS. 12 and 13 show further details of the cover 14.

In operation, to install the insect station 10 into the ground, a hole is made using an auger. An auger that drills a hole two inches in diameter may be used. The hole may be widened at the top by tilting the auger away from a vertical position. The hole may alternatively be made by a bulb planter and trowel. The hole is preferably about three and one-half inches at the top and preferably tapers to about two inches at the bottom. The hole is adequately sized for the depth and width of the cup 16 and the surrounding base 12. The cup 16 is then seated within the base 12, with the cup 16 being frictionally engaged by the tapered sidewall 22 even before the lip 34 of the cup 16 is seated on the inner rim or first lip or seat 32. The cup 16 and base 12 (or the assembled station 10 as a whole if no stakes are being used to anchor the station 10) is then pushed down into the hole so that the second lip or outer rim 48 is at ground level and so that the sharp edge 70 of the second lip or outer rim 48 of the base 12 digs into the ground. The hole is preferably sufficiently deep such that the cup 16 is not pushed up out of engagement with the base 12. One to four stakes may then be inserted through openings 52 and driven into the ground to anchor the base 12. Preferably, two stakes or spikes are used in diametrically opposed openings 52. The stakes are preferably angled away from the cup 16.

With the base 12 and cup 16 in the ground, an attractant or bait or nothing may be placed into the cup 16. An attractant may be beer. An attractant may be a liquid, gel or solid. Bait may be a toxic substance that the insect takes back to its nest. Bait may be a liquid, gel or a solid type bait like a granular bait. Or the insect station may be used as a straight blunder trap, with no attractants or bait, for monitoring purposes. For monitoring purposes, water or oil can be put in the cup 16 to minimize escape of insects from the cup 16. When monitoring, holes may be placed in the bottom 116 or sidewall 22 of the cup 16 to minimize the chance that the cup 16 will collect rainwater or water from other sources such as sprinklers and overflow, thereby spilling the insects that have been collected for study. For baiting purposes, the bait may be placed in the bottom 116 of the cup 16, on and in the feeding matrix or network 112, on the retainer ring 18, on the second lip or outer rim 48 and outside the station 10 on the ground. Such a trail may help ants find the bait in the cup 16 more quickly.

After the bait, attractant, water, or nothing at all has been placed in the cup 16, the retainer or retainer ring 18 may be seated on the first lip or inner rim or seat 32 right where the lip or upper edge 34 of the cup 16 is seated. Then the cover 14 is locked to the base 12 by 1) placing two of the legs 92 downwardly into keyholes 54, then 2) flexing the other two legs 92 inwardly and placing these two legs into their respective keyholes 54, then 3) rotating the cover 14 counter-clockwise to snap the legs 92 into their respective keyholes 56. Installation of the insect station 10 is thereby complete.

To remove the insect station 10 from the ground, the station 10 may simply be lifted out, taking care to remove the stakes from the ground. Or the station 10 can be serviced while the base 12 is still staked to the ground. To service the station 10 in the ground while the base 12 is staked to the ground, the cover 14 is rotated clockwise to snap the keys 92 into the keyholes 54, then two adjacent keys 92 are flexed inwardly such as by pressing on the keys 92 with one's fingers, and then the other two keys or legs 92 will simply lift out. The bait (or attractant) can be refilled through the hole in the retainer 18. Or the retainer 18 can be removed such that the cup 16 can be removed and replaced by another cup 16. Or the cup 16 can be cleaned in position in the base 12. Or the cup 16 can be removed, cleaned and placed back into the base 12.

For baiting, the insect station 10 is preferably placed in areas where ants forage, such as in landscaped beds and around the perimeter of structures. Spacing and frequency depends on the nature and severity of the infestation.

For monitoring, the insect station 10 is placed around the perimeter of the area or structure for which protection will ultimately be sought. The station 10 may be spaced every thirty to fifty feet. For trapping, the station 10 is placed where the target pest is active—for example in garden areas for slugs.

It should be noted that the base 12, cup 16, and retainer 18 alone or in combination may be referred to as a first piece and that the cover 14 may be referred to as a second piece. When such first and second pieces are engaged to each other, a harborage is created for the insect.

It should be noted that the base 12 and cup 16 alone may be used as an insect station. Or the base 12, cup 16, and retainer 18 alone may be used as an insect station. Or the base 12, cup 16, and cover 14 alone may be used as an insect station. Or the base 12, cup 16, retainer 18, and cover 14 alone may be used as an insect station. Or the base 12, cup 16, network 112, and cover 14 alone may be used as an insect bait station. Or the base 12, cup 16, network 112, retainer 18, and cover 14 may be used as an insect bait station.

It should be noted that base 12, cup 16, retainer 18, and cover 14 have a common axis A, as shown in FIGS. 4 and 5.

When the insect station 10 is assembled in the nature of a bait station, as shown in FIGS. 3 and 5, it should be noted that the second lip or outer rim 48 of the base 12 is disposed at a first lesser height and that the edge 84 forming smaller opening 85 is disposed a second greater height. It is further noted that the sidewall of the retainer 18 extends downwardly and outwardly from the edge 84, further extends over the lip 34 of the cup 16, and then terminates at edge 82. With such a structure, rainfall or water from other sources such as sprinklers may flow over outer rim 48 (which is preferably set at ground level) and may not flow over edge 84 (which at its second greater height is preferably set slightly higher than ground level). As water flows over outer rim 48, the water will flow down the sidewall of the retainer 18 and out of holes 42. With such a structure, the retainer 18 caps off the lip 34 of the cup 16 and directs the water out of holes 42, thereby minimizing the chances that water will dilute the bait set in the bottom of the cup 16.

It should be noted that, when the insect station 10 is being used in the nature of a baiting station, such as shown in FIGS. 3 and 5, the upper edge 84 of the retainer 18 is only slightly spaced from the underside of the cover 14 and is even closer to the lower edges of the ribs 104. The space between the underside of the cover 14 and the upper edge 84 of the retainer 18 is about the height of a common insect such as an ant or yellow jacket. Such a vertically extending space is preferably between about one-sixteenth of an inch and about one-quarter of an inch. A horizontally extending space between the upper edge 84 of the retainer 18 and the circular rib 104 is about the length of a common insect such as an ant or yellow jacket. Such a horizontally extending space is preferably between about one-eighth of an inch and one-half of an inch. With the close fit between the upper edge 84 of the retainer 18 and the underside of the cover 14, an effective seal is created that permits the entry of insects but minimizes the evaporation of bait and minimizes the entry of water and dirt and debris.

It should be noted that the insect station 10 may be used to bait, trap and/or monitor insects such as ants, wasps, hornets, fruit flies, moths, roaches, crickets, earwigs, and yellow jackets. Further, the insect station 10 may be used to trap and/or monitor insect-sized pests such as slugs, snails and scorpions.

It should be noted that the bottom of the cup 16 preferably extends a considerable distance past the base 12. The sidewall and bottom of the cup 16 are generally free from outside forces when it is placed within the ground. The base 12 and cover 14 are preferably somewhat sturdy and durable because such portions may be stepped upon. However, the cup 16 may be of various depths. For example, the cup 16 may be relatively short such that the bottom of the cup 16 terminates at about the bottom of the base 12 such that the base 12 provides protection for the entire sidewall of the cup 16.

Figure 14:
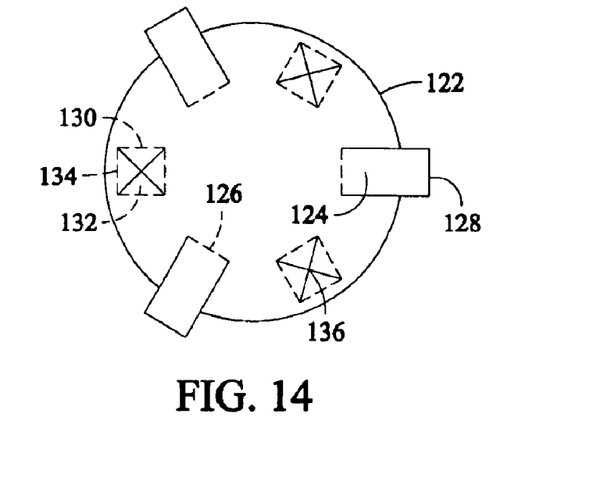
FIG. 14 is a top view of a one-way disk that is placed in the retainer of the insect station.
Figure 15:
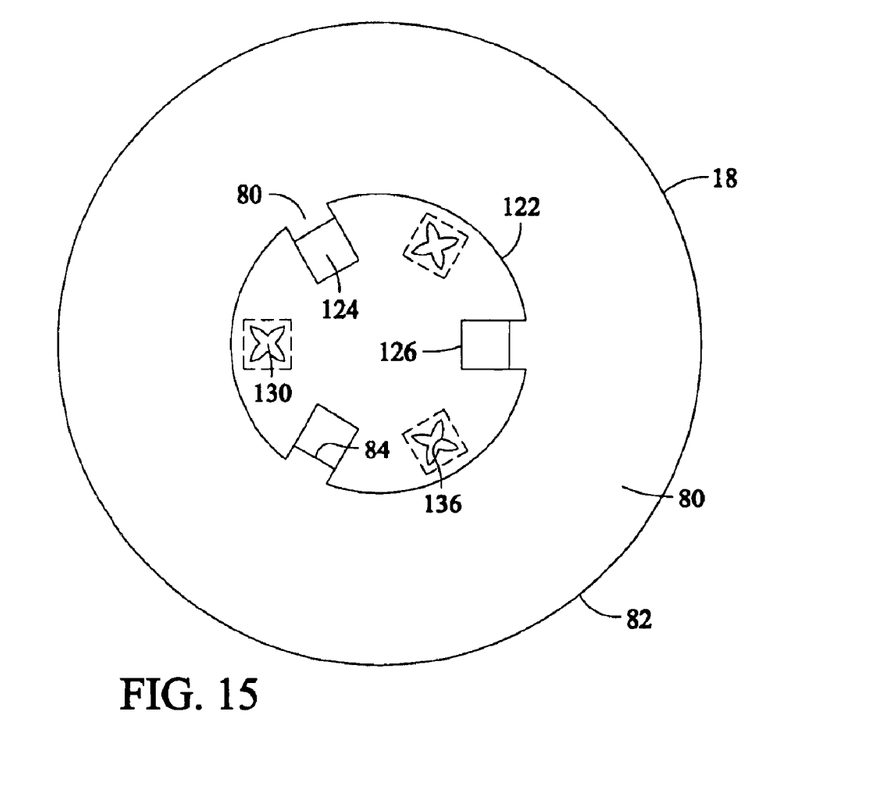
FIG. 15 is a top view of the one-way disk of FIG. 14 snapped into place in the retainer.

As shown in FIGS. 14 and 15, the insect station 10 may include a one-way disk 122 for being snapped onto the edge 84 of the retainer 18. The one-way disk 122 is especially used to trap flying insects when the station 10 is hung from an object. The one-way disk 122 is placed at the exit (or edge 84) of the retainer 18 and hence at the entrance to the cup 16. The one-way disk 122 is black and is formed of plastic. The one-way disk 122 includes a set of three integral tabs 124. Each of the tabs 124 is resiliently foldable at a fold line 126 and includes a distal end 128 that is snappable to the underside of the retainer 18 when tab 124 is folded. The one-way disk 122 includes a set of three apertures 130. Each of the apertures 130 is formed by a set of four flaps 132. Each of the flaps 132 is foldable somewhat resiliently at a fold line 134. Each of the flaps 132 includes a sharp tip 136. The one-way disk 122 includes a diameter greater that the diameter of edge 84, but sufficiently close to the diameter of edge 84 so that the disk 122 may be seated close to edge 84 with tabs 124 snapped over edge 84 to hold the disk 122 in place. Depending upon the type of insect that is to be trapped, the apertures 130 may be opened relatively widely or relatively narrow by depressing an object such as a finger or pen into the flaps 132. When the flaps 132 are opened or partially opened, the flaps 132 extend in the direction into the cup 16. Hence an insect such as a yellow jacket may easily fly through the aperture 130, but the sharp tips 136 await the yellow jacket upon its return and attempted exit from the cup 16. The one-way disk 122 is preferably used with a cup 16 that transmits light. The one-way disk 122 is preferably of a darker color and more preferably is black to minimize transmission of light through retainer opening 85 and disk apertures 130 so as to minimize the chances of flying insects being attracted to the exit of the station 10.

It should be noted that the cup 16 nestles into the base 12. This nestling naturally occurs because of the taper of the base 12 and the taper of the cup 16. This nestling may or may not include a wedging or frictional type fit. Further, this nestling may occur exclusive of the tapering of the base 12 and the tapering of the cup 16. For example, the lip 34 may be of a slightly greater diameter than an inside diameter of the inner rim 32 of the base 12, and such a lip 34 may be received by inner rim 32 with the sidewall of the cup 16 confronting but not engaging the sidewall of the base 12. Accordingly, the station 10 may engage a great variety of cups 16.

It should be noted that bait means a poison intended to kill an insect. It should be noted that an attractant means a non-poison.

As shown in FIGS. 4, 5 and 7, base 12 is bottomless so as to include a through-opening for cup 16.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. An insect station, comprising:
    a) a cup selected from the group of paper and plastic cups, wherein the cup comprises a sidewall, a floor integral with the sidewall, and a cup opening formed by the sidewall and being opposite of the floor, wherein the cup opening has a diameter;
    b) a base having a width greater than the diameter of the cup opening, wherein the base includes a base opening, wherein the base opening opens through the base, wherein the cup is insertable into the base opening, wherein the base confronts the cup about the sidewall of the cup, and wherein the base and base opening are sized relative to the cup such that an end portion of the cup engages the base and such that an opposite end portion of the cup may extend through the base opening;
    c) a cover engagable to the base, wherein the cover has a width greater than a width of the base opening, wherein, when the cover is engaged to the base, a portion of the cover is spaced from the base to form an insect opening between the cover and the base such that insects can have access to the cup through the insect opening; and
    d) wherein one of the base and cover includes a key and wherein the other of the base and cover includes a keyhole, wherein the key is brought into the keyhole by drawing the base and cover together, and wherein the key is locked into the keyhole by rotating the cover relative to the base.

2. The insect station according to claim 1, wherein the cover and base are shaped such that the key must be flexed before it can be inserted or withdrawn from the keyhole.

3. The insect station according to claim 1, wherein the cover and base are shaped such that the key must be flexed before the key can be locked into or unlocked from the keyhole.

4. An insect station, comprising:
    a) a cup selected from the group of paper and plastic cups, wherein the cup comprises a sidewall, a floor integral with the sidewall, and a cup opening formed by the sidewall and being opposite of the floor, wherein the cup opening has a diameter;
    b) a base having a width greater than the diameter of the cup opening, wherein the base includes a base opening wherein the base opening opens through the base, wherein the cup is insertable into the base opening, wherein the base confronts the cup about the sidewall of the cup, and wherein the base and base opening are sized relative to the cup such that an end portion of the cup engages the base and such that an opposite end portion of the cup may extend through the base opening;

c) a cover engagable to the base, wherein the cover has a width greater than a width of the base opening; and d) wherein the cover comprises a leg, wherein the leg engages the cover to the base, wherein the leg spaces the cover from the base, wherein the leg includes a first foot extending on a first side of a portion of the base and wherein said leg includes a second foot extending on an opposing side of said portion of the base, wherein said first foot and said second foot run transverse to an axis of the cover and base to minimize movement of the cover and base along said axis when the leg is engaged to the base, and wherein said first foot and said second foot permit rotation of the cover and base relative to each other to permit the leg to be brought into position to be disengaged from the base.

5. An insect station, comprising:

a) a cup selected from the group of paper and plastic cups, wherein the cup comprises a sidewall, a floor integral with the sidewall, and a cup opening formed by the sidewall and being opposite of the floor, wherein the cup opening has a diameter;

b) a base having a width greater than the diameter of the cup opening, wherein the base includes a base opening, wherein the base opening opens through the base, wherein the cup is insertable into the base opening, wherein the base confronts the cup about the sidewall of the cup, and wherein the base and base opening are sized relative to the cup such that an end portion of the cup engages the base and such that an opposite end portion of the cup may extend through the base opening; and c) a network of lines, wherein the network is disposed in the cup, wherein the network includes a height sufficient to extend between about the floor of the cup and at least to a height defined by the opening of the cup such that insects may utilize the network as a ladder to climb into and out of the cup.

6. An insect station, comprising:

a) a cup selected from the group of paper and plastic cups, wherein the cup comprises an endless sidewall, a floor integral with the sidewall, and a cup opening formed by the sidewall and being opposite of the floor, wherein the cup opening has a diameter, wherein the sidewall includes an upper edge forming the cup opening;

b) a base having a width greater than the diameter of the cup opening, wherein the base includes a base opening, wherein the cup is insertable into the base opening, wherein the base confronts the cup about the sidewall of the cup;

c) a retainer for confronting each of the base and the cup when the cup is engaged in the base, wherein the retainer engages the base and confronts the base about at least a portion of the base opening, wherein the retainer confronts the cup about at least a portion of the upper edge of the cup;

d) a cover engagable to the base and spaced from the retainer, wherein the cover has a width greater than a width of the base opening;

e) wherein at least one of the base, cover, and combination of the base and cover comprises an insect opening for access by an insect to the cup; and f) wherein the retainer includes a tapered portion, wherein the base includes an axis, wherein the retainer is engagable with the base when the tapered portion of the retainer tapers along the axis in one direction, and wherein the retainer is engagable with the base when the tapered portion of the retainer tapers along the axis in the other direction such that the retainer is engagable with the base when the retainer is turned right-side up and upside-down relative to the base.

7. An insect station, comprising:

a) a cup selected from the group of paper and plastic cups, wherein the cup comprises an endless sidewall, a floor integral with the sidewall, and a cup opening formed by the sidewall and being opposite of the floor, wherein the cup opening has a diameter, wherein the sidewall includes an upper edge forming the cup opening;

b) a base having a width greater than the diameter of the cup opening, wherein the base includes a base opening, wherein the cup is insertable into the base opening, wherein the base confronts the cup about the sidewall of the cup;

c) a retainer for confronting each of the base and the cup when the cup is engaged in the base, wherein the retainer engages the base and confronts the base about at least a portion of the base opening, wherein the retainer confronts the cup about at least a portion of the upper edge of the cup;

d) a cover engagable to the base, wherein the cover has a width greater than a width of the base opening;

e) wherein at least one of the base, cover, and combination of the base and cover comprises an insect opening for access by an insect to the cup; and f) wherein one of the base and cover includes a key and wherein the other of the base and cover includes a keyhole, wherein the key is brought into the keyhole by drawing the base and cover together, and wherein the key is locked into the keyhole by rotating the cover relative to the base.

8. An insect station comprising:

a) a first piece having a receptacle;

b) a second piece engagable to the first piece, wherein the first and second pieces with the receptacle form a harborage for insects when the first and second pieces are engaged to each other;

c) wherein one of the first and second pieces includes a key and wherein the other of the first and second pieces includes a keyhole, wherein the key is brought into the keyhole by drawing the first and second pieces together, and wherein the key is locked into the keyhole by relatively rotating the first and second pieces;

d) wherein the first and second pieces are shaped such that the key must be flexed before it can be inserted or withdrawn from the keyhole; and e) wherein said key doubles as a leg to engage and space the first and second pieces relative to each other such that an insect opening is formed between the first and second pieces.

9. An insect station comprising:

a) a first piece having a receptacle;

b) a second piece engagable to the first piece, wherein the first and second pieces with the receptacle form a harborage for insects when the first and second pieces are engaged to each other;

c) wherein one of the first and second pieces includes a key and wherein the other of the first and second pieces includes a keyhole, wherein the key is brought into the keyhole by drawing the first and second pieces together, and wherein the key is locked into the keyhole by relatively rotating the first and second pieces;

d) wherein the first and second pieces are shaped such that the key must be flexed before the key can be locked into or unlocked from the keyhole; and e) wherein said key doubles as a leg to engage and space the first and second pieces relative to each other such that an insect opening is formed between the first and second pieces.

10. An insect station comprising:

a) a first piece having a receptacle;

b) a second piece engagable two the first piece, wherein the first and second pieces with the receptacle form a harborage for insects when the first and second pieces are engaged to each other;

c) wherein the harborage includes an entrance that also serves as an exit from the harborage; and d) wherein the entrance includes a flap foldable between a relatively closed position and a relatively open position whereby a size of the entrance may be adjusted, and wherein the flap comprises a tip, wherein the tip extends into the harborage such that an insect attempting to leave the harborage encounters the tip.

11. An insect station comprising:

a) a harborage for insects;

b) wherein the harborage includes an entrance that also serves as an exit from the harborage;

c) wherein said entrance is adjustable in size depending upon a type of insect to be to be trapped, and —wherein the entrance includes a flap foldable between a relatively closed position and a relatively open position whereby a size of the entrance may be adjusted;

d) wherein the harborage further comprises a tip disposed adjacent said entrance and extending in a direction into the harborage such that said tip awaits an insect upon the insect's attempted exit from the harborage through said exit.

12. An insect station comprising:

a) a harborage for insects;

b) wherein the harborage includes an entrance that also serves as an exit from the harborage;

c) wherein said entrance is adjustable in size depending upon a type of insect to be to be trapped, and —wherein the entrance includes a flap foldable between a relatively closed position and a relatively open position whereby a size of the entrance may be adjusted;

d) wherein the harborage further comprises a portion forming said entrance and another portion spaced from the entrance, wherein said portion forming said entrance is of a relatively dark color to minimize transmission of light through said entrance, and wherein said another portion transmits light.

13. The insect station according to claim 1, wherein the insect station is adaptable to be set in the ground.

14. The insect station according to claim 1, wherein the insect station is adaptable to be hung in position for flying insects.

15. The insect station according to claim 6, wherein the insect station is adaptable to be set in the ground.

16. The insect station according to claim 6, wherein the insect station is adaptable to be hung in position for flying insects.

17. The insect station according to claim 11, wherein the insect station is adaptable to be set in the ground.

18. The insect station according to claim 11, wherein the insect station is adaptable to be hung in position for flying insects.

* * * * *